United States Patent [19]

Throneburg et al.

[11] Patent Number: 5,724,753
[45] Date of Patent: *Mar. 10, 1998

[54] FOOTWEAR SYSTEM

[75] Inventors: James L. Throneburg, 625 W. Bell St., Statesville, N.C. 28687; James G. McLelland, Statesville, N.C.; Victor J. Gallenstein, Maysville, Ky.; Leon E. Kelley, Needham, Mass.; Douglas H. Richie, Long Beach, Calif.

[73] Assignee: James L. Throneburg, Statesville, N.C.

[*] Notice: The term of this patent shall not extend beyond the expiration date of Pat. No. 5,595,005.

[21] Appl. No.: 726,551

[22] Filed: Oct. 7, 1996

Related U.S. Application Data

[63] Continuation of Ser. No. 467,820, Jun. 6, 1995, abandoned, which is a continuation of Ser. No. 216,264, Mar. 21, 1994, Pat. No. 5,595,005, which is a continuation-in-part of Ser. No. 97,086, Jul. 23, 1993, abandoned.

[51] Int. Cl.⁶ .......................... A43B 13/12; A43B 13/14
[52] U.S. Cl. .................... 36/91; 36/30 R; 36/31; 36/10; 36/28
[58] Field of Search ............. 36/114, 113, 9 R, 36/10, 25 R, 28, 30 R, 30 A, 31, 34 R, 35 R, 37, 43, 44, 91, 55, 71, 145, 166, 173–174, 178, 180–181, 176; 2/239, 241; 66/182, 185–187, 178 R

[56] References Cited

U.S. PATENT DOCUMENTS

| | | | |
|---|---|---|---|
| 1,163,395 | 12/1915 | Cushman | 36/176 |
| 1,349,355 | 8/1920 | Zink | 36/178 |
| 1,849,458 | 3/1932 | Jung . | |
| 1,971,108 | 8/1934 | Karow . | |
| 1,989,350 | 1/1935 | Cooper . | |
| 2,026,620 | 1/1936 | Finn . | |
| 2,034,463 | 3/1936 | Dvlinsky . | |
| 2,062,557 | 12/1936 | Clark . | |

(List continued on next page.)

FOREIGN PATENT DOCUMENTS

| | | |
|---|---|---|
| 2 661 805 | 11/1991 | France . |
| 815760 | 12/1951 | Germany . |
| 7230764 | 12/1972 | Germany . |
| 2852894 | 12/1980 | Germany . |
| 3212644 | 10/1983 | Germany . |
| 3314525 | 10/1984 | Germany . |
| 8621712 | 1/1987 | Germany . |
| 3600096 | 7/1987 | Germany . |
| 3723516 | 1/1989 | Germany . |
| 109751 | 9/1974 | Japan . |
| 120631 | 12/1975 | Japan . |
| 002647 | 1/1977 | Japan . |
| 70804 | 5/1980 | Japan . |
| 125201 | 5/1988 | Japan . |
| 3-4802 | 1/1991 | Japan . |
| 256494 | 2/1949 | Switzerland . |
| 212336 | 3/1924 | United Kingdom . |
| 92/019191 | 11/1992 | WIPO ........................... 36/173 |

*Primary Examiner*—Ted Kavanaugh
*Attorney, Agent, or Firm*—Bell Seltzer Intellectual Property Law Group of Alston & Bird, LLP

[57] ABSTRACT

A footwear system for providing enhanced protection and comfort to the foot of a wearer by reducing impact and shearing forces normally received by the foot. The footwear system has a knit sock and a shoe. The knit sock overlies and contacts the shoe and includes a ball portion, a heel portion, and an arch portion disposed between the ball and heel portions. Each of the ball and heel portions is formed of thicker knit fabric than the arch portion thereby providing a greater amount of protection and cushioning to the ball and heel of the foot of the wearer than to the arch portion. The shoe includes a sole having a ball portion, a heel portion, and a raised arch portion for contacting and interfacing with the respective overlying portions of the sock. The raised arch portion of the sole preferably corresponds substantially to the lengthwise extent of the thinner fabric arch portion of the sock when positioned on the foot of a wearer so as to provide a substantially mating interfacing relationship for added protection and comfort to the wearer thereof.

13 Claims, 8 Drawing Sheets

U.S. PATENT DOCUMENTS

| | | |
|---|---|---|
| 2,091,387 | 8/1937 | Diller . |
| 2,097,476 | 11/1937 | Silver . |
| 2,119,590 | 6/1938 | MacDonald . |
| 2,154,997 | 4/1939 | Schipper . |
| 2,194,637 | 3/1940 | Burger . |
| 2,247,818 | 7/1941 | Nast . |
| 2,265,869 | 12/1941 | Scholl . |
| 2,266,369 | 12/1941 | Kohn . |
| 2,465,817 | 3/1949 | Perugia . |
| 2,598,297 | 5/1952 | Pierson . |
| 2,955,326 | 10/1960 | Murray . |
| 3,258,862 | 7/1966 | Minor et al. . |
| 3,320,347 | 5/1967 | Greenawalt . |
| 3,470,880 | 10/1969 | Pagliano ............................ 36/178 |
| 3,673,623 | 7/1972 | Zohar . |
| 3,724,014 | 4/1973 | Bennett et al. . |
| 3,790,978 | 2/1974 | Condamine et al. . |
| 3,881,205 | 5/1975 | Funck . |
| 3,922,800 | 12/1975 | Miller et al. . |
| 4,020,570 | 5/1977 | Shames . |
| 4,044,417 | 8/1977 | Cohen . |
| 4,166,329 | 9/1979 | Herbig . |
| 4,194,249 | 3/1980 | Thorneburg ............................ 66/182 |
| 4,253,317 | 3/1981 | Howard et al. . |
| 4,265,033 | 5/1981 | Pols . |
| 4,286,348 | 9/1981 | White, Sr. . |
| 4,305,212 | 12/1981 | Coomer . |
| 4,306,361 | 12/1981 | Kaschura . |
| 4,314,411 | 2/1982 | Hanson . |
| 4,373,361 | 2/1983 | Thorneburg . |
| 4,412,364 | 11/1983 | Orea Mateó . |
| 4,435,910 | 3/1984 | Marc ............................ 34/44 |
| 4,523,345 | 6/1985 | Orea Mateo . |
| 4,575,954 | 3/1986 | Bye ............................ 36/89 |
| 4,597,196 | 7/1986 | Brown . |
| 4,603,493 | 8/1986 | Eston ............................ 36/44 |
| 4,716,662 | 1/1988 | Bar . |
| 4,741,062 | 5/1988 | Blanc et al. . |
| 4,805,319 | 2/1989 | Tonkel . |
| 4,817,222 | 4/1989 | Shafir . |
| 4,817,305 | 4/1989 | Wetzel . |
| 4,831,750 | 5/1989 | Müller . |
| 4,843,741 | 7/1989 | Yung-Mao ............................ 36/28 |
| 4,845,862 | 7/1989 | Phillips, Jr. et al. . |
| 4,852,273 | 8/1989 | Hamy . |
| 4,884,309 | 12/1989 | Shafir . |
| 4,893,418 | 1/1990 | Ogden . |
| 4,897,938 | 2/1990 | Otsuka . |
| 4,906,425 | 3/1990 | Poussou . |
| 4,908,961 | 3/1990 | Purslow et al. . |
| 4,955,148 | 9/1990 | Padilla . |
| 5,003,708 | 4/1991 | Daley . |
| 5,014,448 | 5/1991 | Perrone . |
| 5,018,233 | 5/1991 | Waterfield et al. . |
| 5,054,147 | 10/1991 | Motsch . |
| 5,123,181 | 6/1992 | Rosen . |
| 5,131,173 | 7/1992 | Anderiè . |
| 5,163,237 | 11/1992 | Rosen . |
| 5,184,409 | 2/1993 | Brown . |
| 5,203,096 | 4/1993 | Rosen . |
| 5,228,164 | 7/1993 | Graf et al. . |
| 5,231,723 | 8/1993 | White et al. . |
| 5,233,767 | 8/1993 | Kramer . |
| 5,335,517 | 8/1994 | Throneburg et al. ............................ 36/89 |

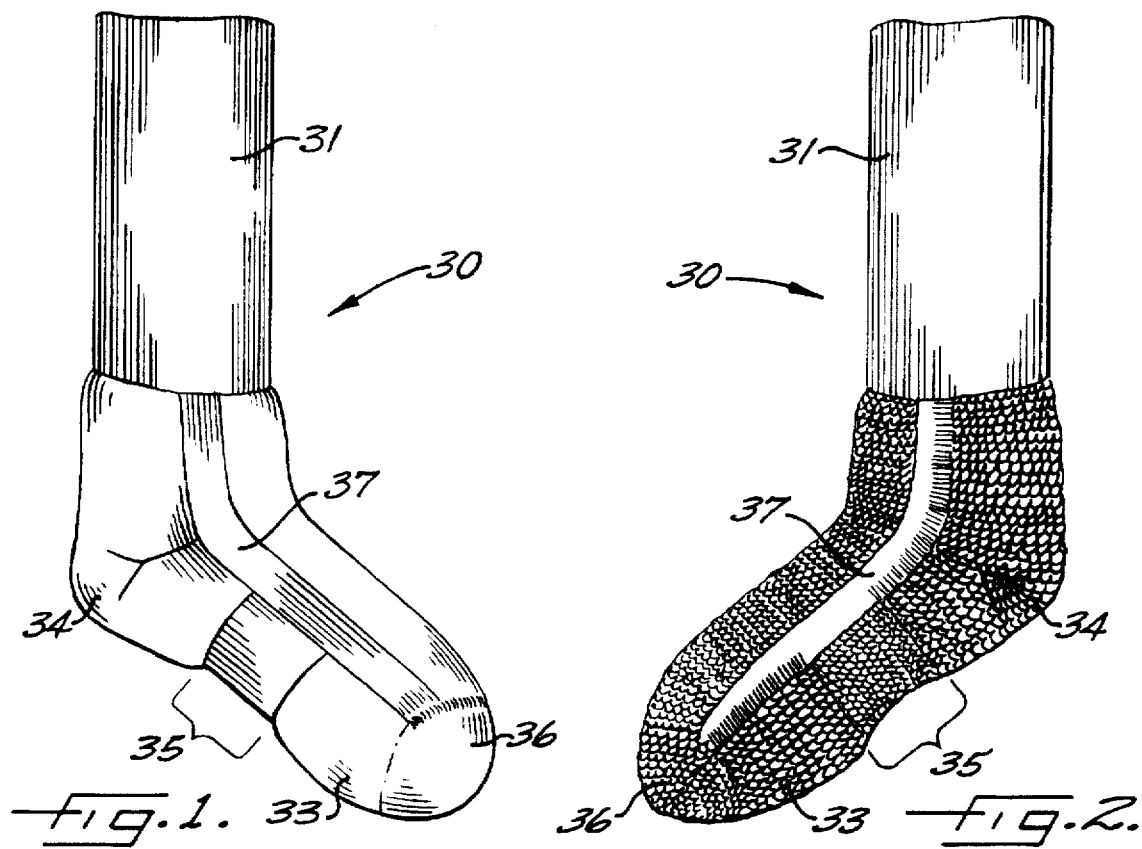
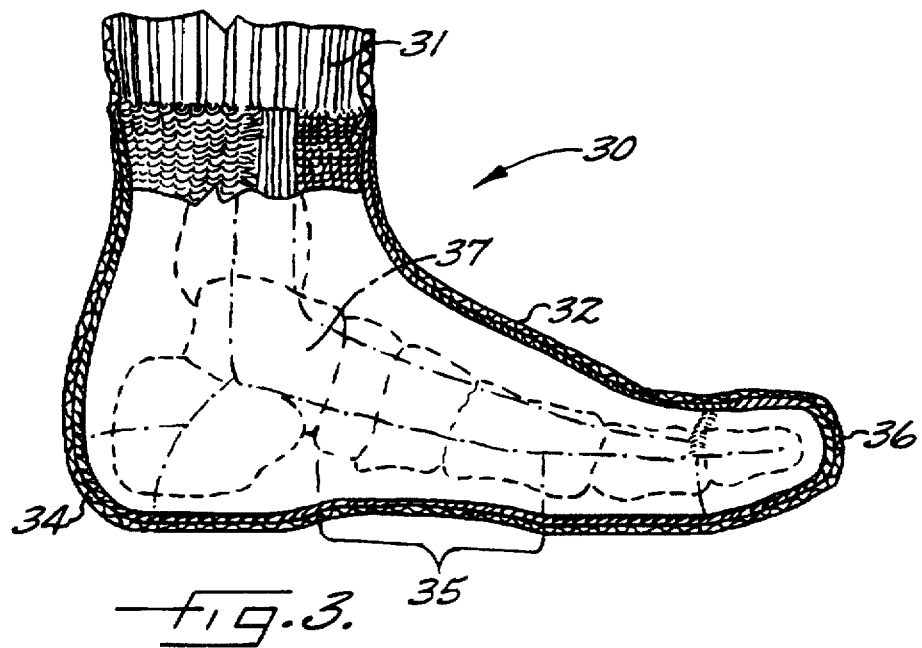

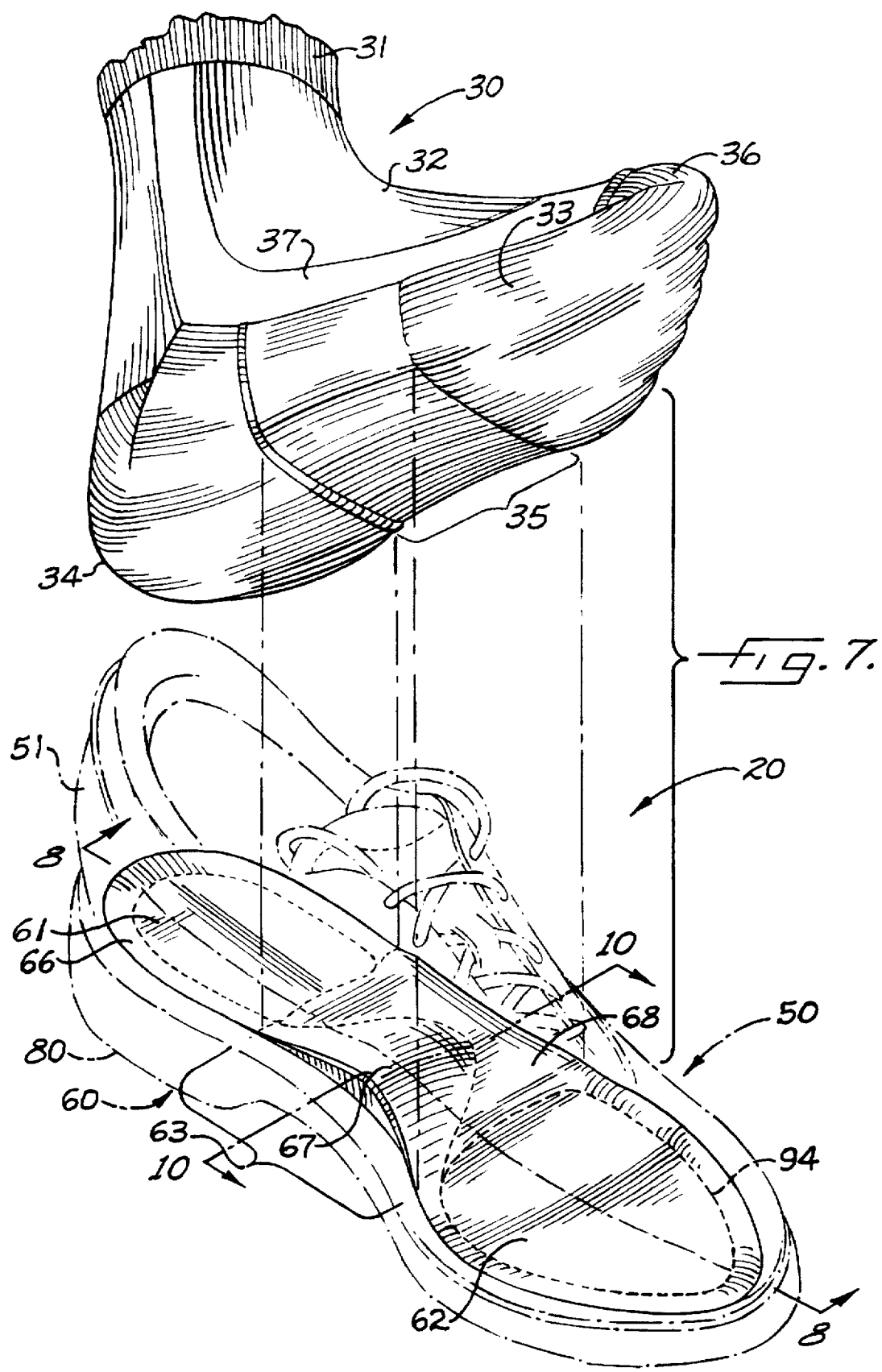

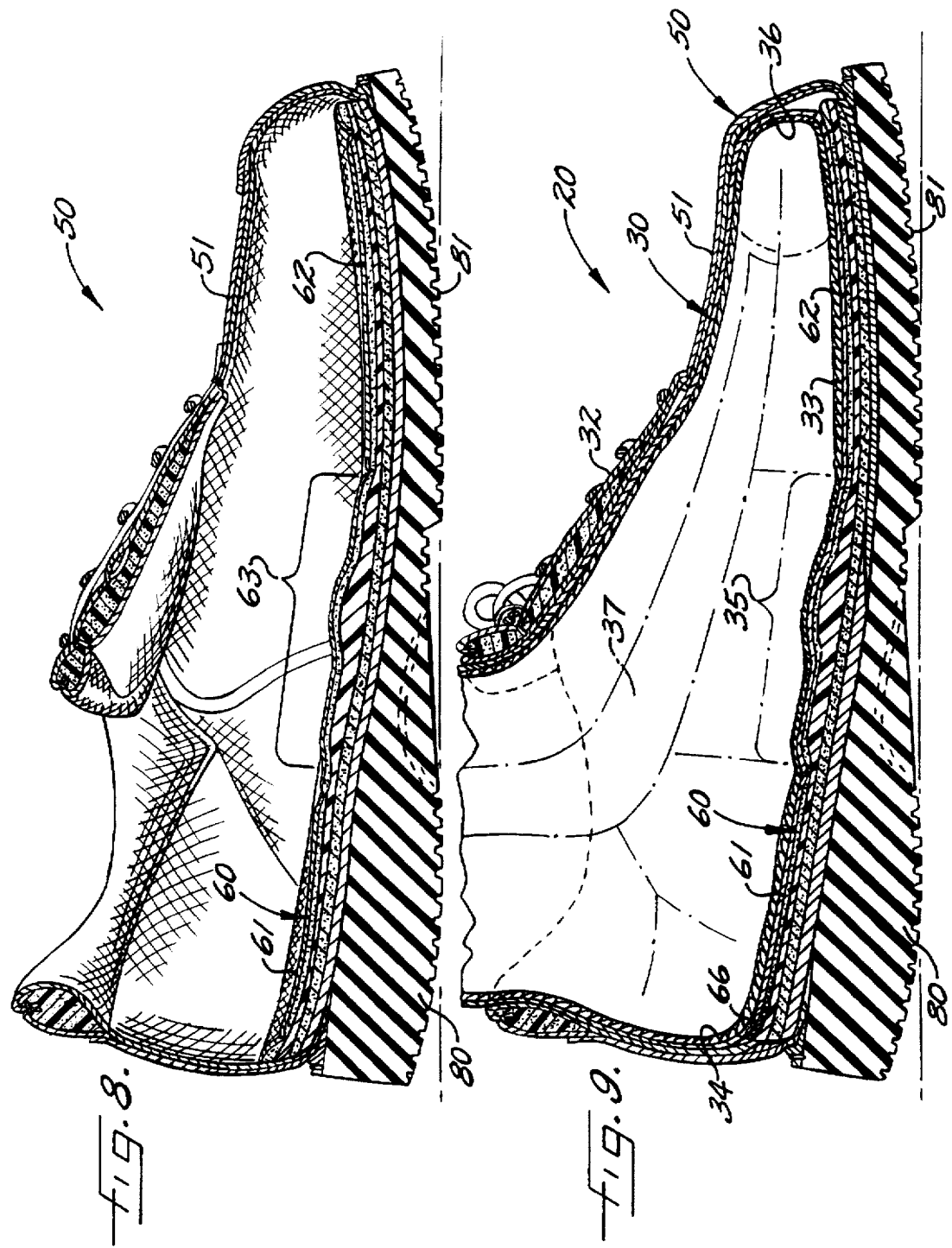

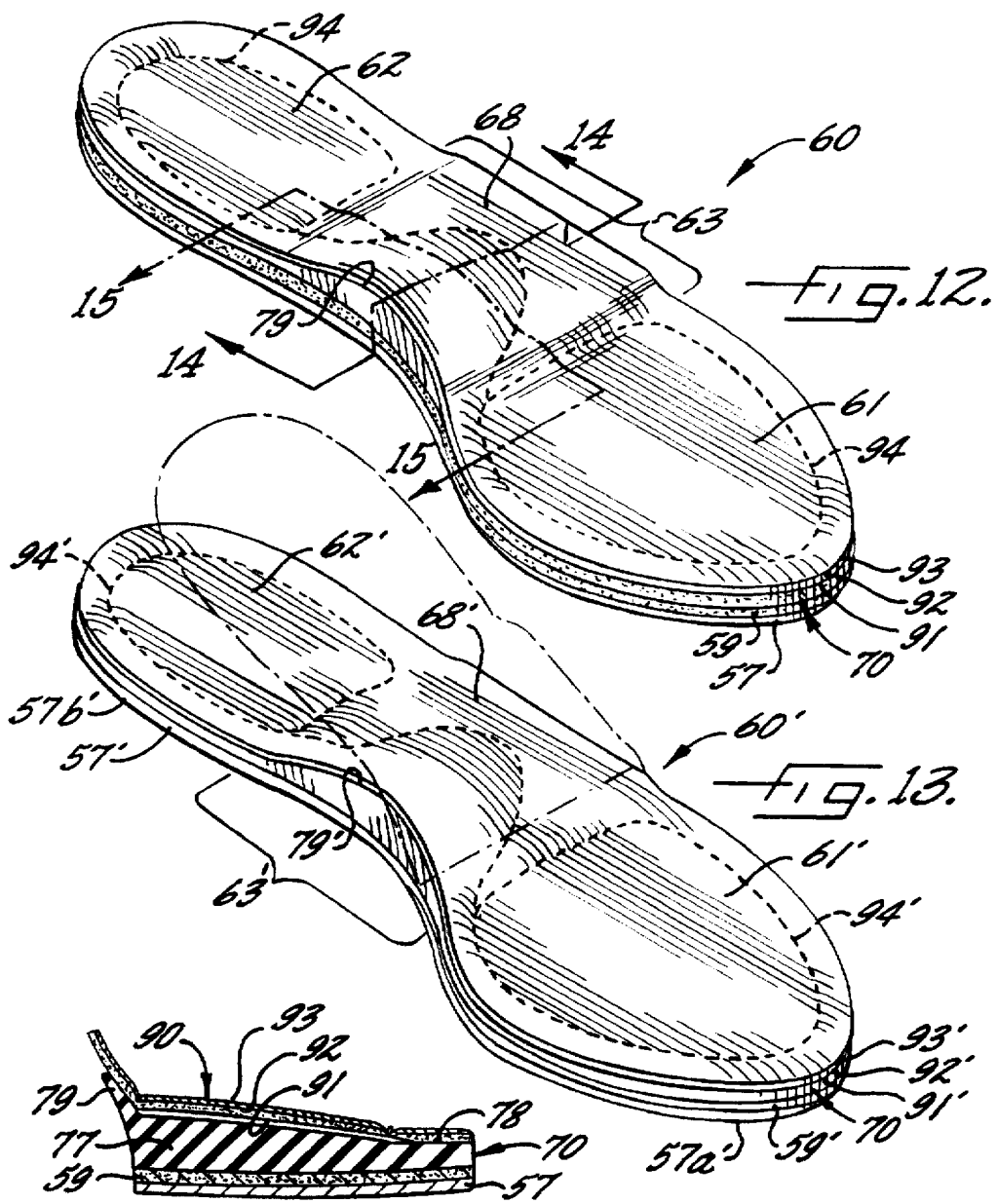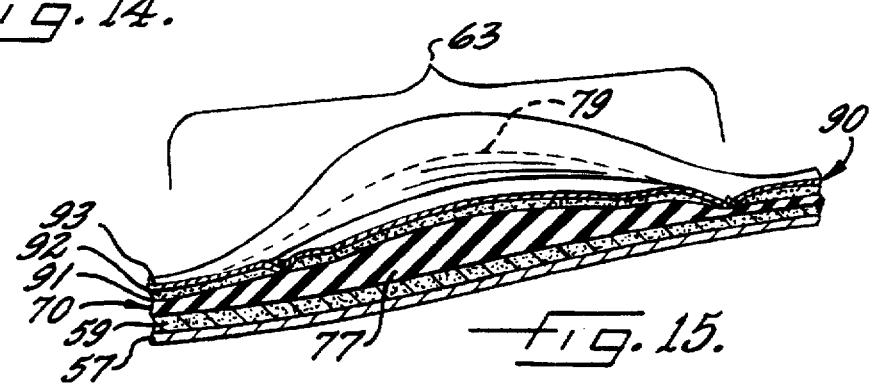

FOOTWEAR SYSTEM

RELATED APPLICATIONS

This application is a continuation of application Ser. No. 08/467,820, filed Jun. 6, 1995 abandoned. Which is a continuation of application Ser. No. 08/216,264, filed Mar. 21, 1994 now U.S. Pat. No. 5,595,005, which is a continuation-in-part of copending application Ser. No. 08/097,086, filed Jul. 23, 1993 abandoned.

FIELD OF THE INVENTION

This invention relates to footwear and, more particularly, to a footwear system having a sock and a shoe for interfacing with the sock.

BACKGROUND OF THE INVENTION

Various shoes have been developed over the years which have attempted to emulate the sole of the foot of the wearer to thereby provide a degree of comfort when walking, running, or the like. These shoes typically anticipated the wearer to use a conventional thin knit sock with the shoe so that the innersole of the shoe substantially corresponds to the sole of the foot. Examples of such shoes may be seen in U.S. Pat. No. 4,831,750 by Muller entitled "Shoe-Construction, Shoe-Construction Product, and Method Of Fabricating The Products" and U.S. Pat. No. 4,305,212 by Coomer entitled "Orthotically Dynamic Footwear."

The common assignee of the present invention, however, recognized that when wearing shoes, the major wear and tear on the foot occurs in the ball and heel regions of the foot because a major portion of the person's weight is distributed in these regions when standing, walking, or running. Therefore, the common assignee developed a knit sock having an increased density of knit fabric in the ball and heel portions of the sock to provide added comfort to the wearer and reduce the damage to these regions of the foot. An example of such a sock may be seen in U.S. Pat. No. 4,194,249 by Thorneburg entitled "Jogging And Running Athletic Sock" assigned to the common assignee of the present invention.

This knit sock, although quite successful in the marketplace, is often worn with shoes which have innersoles conforming to the foot of the wearer, innersoles having a generally flat overall contour, or another contour incompatible with the thicker fabric portions of the knit sock. Hence, the wearer may experience bunching of the fabric of the sock in the shoe, may experience discomfort when worn with various conventional shoes, or may be forced to use a larger size shoe in order to gain the full benefits of these socks.

In light of the foregoing, it is an object of the present invention to provide a footwear system which provides protection and enhanced comfort to the foot of the wearer by matingly interfacing the sole of a shoe with the thicker and thinner fabric portions of a sock.

It is also an object of the present invention to provide a footwear system that reduces shearing forces on the foot of the wearer.

It is an additional object of the present invention to provide a shoe that provides enhanced comfort to the foot of a wearer and that is adapted for matingly interfacing with a sock positioned on the foot of a wearer.

It is a further object of the present invention to provide an innersole that is adaptable to be inserted into a shoe so as to matingly interface with a sock positioned on the foot of a wearer and that provides enhanced comfort to the wearer of the shoe.

SUMMARY OF THE INVENTION

The above and other objects and advantages of the present invention are achieved in the embodiments described herein by the provision of more comfortable footwear for a wearer's foot having thicker fabric ball and heel portions of a sock when positioned on the foot of a wearer matingly interfacing with the sole of a shoe so that wear and tear to the ball and heel portions of the foot of the wearer are reduced during use. The thicker fabric portions of a knit sock when positioned on the foot of a wearer, preferably the ball and heel portions thereof, matingly interface in male/female interlocking fashion with the contours of the sole of the shoe so as to provide internal multi-directional movement in the thicker fabric portions interfacing with the foot of the wearer thereby reducing friction shearing forces and without requiring a larger shoe size. The sole of the shoe has a ball portion, a heel portion, and a raised arch portion for contacting and interfacing with the respective overlying portions of the sock. The raised arch portion of the sole of the shoe preferably corresponds substantially to the lengthwise extent of the thinner fabric arch portion of the sock and also matingly interfaces therewith so that the male/female cooperation between the sock and the sole of the shoe is further enhanced.

More particularly, the footwear system has a knit sock and a shoe. The knit sock overlies and contacts the shoe and includes a ball portion, a heel portion, and an arch portion disposed between the ball and heel portions. Each of the ball and heel portions of the sock is formed of thicker knit fabric than the arch portion of the sock. The thicker knit fabric preferably is formed of a predetermined density of raised terry loops thereby providing a greater amount of protection and cushioning to the ball and heel of the foot of the wearer. The shoe has a sole including a ball portion, a heel portion, and a raised arch portion for contacting and interfacing with the respective overlying portions of the sock. The sole of the shoe, according to the invention, preferably includes an innersole and an outersole. The raised arch portion of the innersole preferably corresponds substantially to the lengthwise extent of the thinner fabric arch portion of the sock when positioned on the foot of the wearer so as to provide a substantially mating interfacing relationship for added protection and comfort to the wearer. The matingly interface relationship of the sock with the innersole of the shoe thereby provides a male/female cooperation type of approach to foot protection which protects against the shearing and impact forces normally received by the foot during activity thereof.

Also, the innersole of the shoe is preferably a multiple layer innersole having a ball portion, a heel portion, and a raised arch portion therebetween. The raised arch portion preferably has a hump, a substantially flat plateau portion extending outwardly from around the lateral periphery of the hump, and oppositely inclined fore and aft portions for providing a smooth transition with the ball portion and major areas of the heel portion. The hump extends widthwise from the medial side of the innersole to central portions of the raised arch portion, has a greater thickness along a medial periphery adjacent the medial side of the innersole, decreasing thickness toward a lateral periphery of the central portions of the innersole from the medial side thereof, and substantially the same contour as major portions of the arch of a foot of a wearer. The innersole may be secured to the outersole, or an intermediate layer therebetween, or may also be advantageously used as an insert and removed as needed by the wearer such as for use with orthotic inserts for a shoe.

DESCRIPTION OF THE DRAWINGS

Some of the objects and advantages of the present invention having been stated, others will become apparent as the description proceeds when taken in conjunction with the accompanying drawings, in which:

FIG. 1 is a perspective view of a knit sock of a footwear system according to the present invention;

FIG. 2 is a perspective view of an everted knit sock of a footwear system according to the present invention illustrating the knit terry loop portions on the inside of the sock;

FIG. 3 is a side cross-sectional view of a knit sock of a footwear system according to the present invention positioned on a foot of a wearer with phantom lines illustrating the bones of the foot for clarity;

FIG. 7 is an exploded view of a footwear system according to the present invention illustrating the matingly interfacing relationship between a knit sock and a shoe;

FIG. 8 is a vertical cross-sectional view of a shoe of a footwear system according to the present invention taken along line 8—8 of FIG. 7;

FIG. 9 is another vertical cross-sectional view of a shoe of a footwear system according to the present invention with the foot of a wearer in phantom lines;

FIG. 12 is a perspective view of an innersole of a shoe of a footwear system according to a first embodiment of the present invention;

FIG. 13 is a perspective view of an innersole of a shoe of a footwear system according to a second embodiment of the present invention with phantom lines illustrating the innersole in a position of partial removal from the shoe;

FIG. 14 is a vertical cross-sectional view of an innersole of a shoe of a footwear system according to the present invention taken along line 14—14 of FIG. 12;

FIG. 15 is a fragmentary vertical cross-sectional view of an innersole of a shoe of a footwear system according to the present invention taken along line 15—15 of FIG. 12;

DETAILED DESCRIPTION OF A PREFERRED EMBODIMENT

Figure 4:
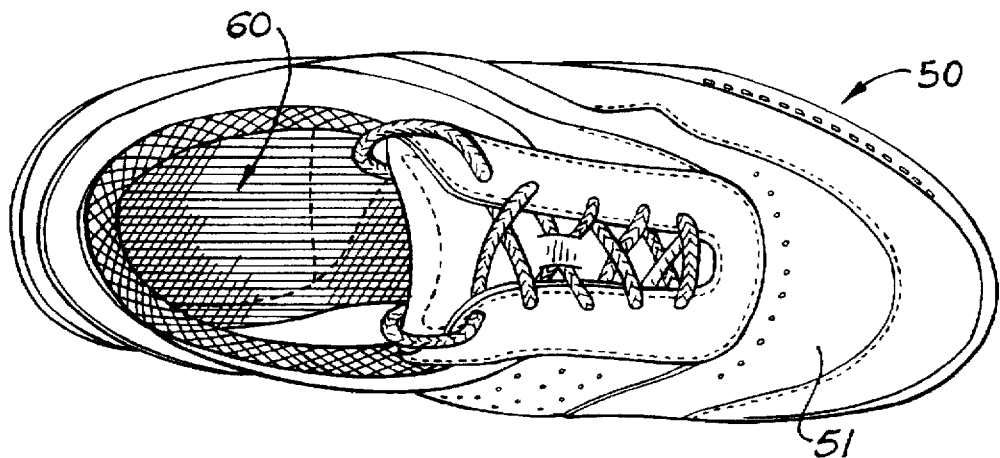
FIG. 4 is a top plan view of a shoe of a footwear system according to the present invention.

The present invention now will be described more fully hereinafter with reference to the accompanying drawings in which illustrated embodiments of the invention are shown. This invention may, however, be embodied in many different forms and should not be construed as limited to the embodiments set forth herein; rather, these embodiments are provided so that this disclosure will be thorough and complete and will fully convey the scope of the invention to those skilled in the art. Like numbers refer to like elements throughout.

The footwear system, according to the present invention, broadly designated at 20, has a knit sock 30 overlying and contacting a shoe 50 as best shown in FIGS. 7 and 9. FIGS. 1–3 show the knit sock 30 of the footwear system 20 including a view of the knit sock on the foot of a wearer with phantom lines illustrating the bones of the foot for clarity. The sock 30 is illustrated as an athletic sock. The sock 30, however, can be knit for use as a dress sock or other varieties of socks as understood by those skilled in the art. The sock 30 preferably is knit similar to the sock disclosed in the common assignee co-pending U.S. patent application Ser. No. 08/096,708 entitled "Anatomical Isotonic Sock" filed Jul. 23, 1993 which is also hereby incorporated herein by reference. The sock may also be knit similar to the sock disclosed in the common assignee U.S. Pat. No. 4,194,249 entitled "Jogging and Running Athletic Sock" which additionally is hereby incorporated herein by reference.

As shown in FIGS. 1–3, the knit sock 30 preferably has a leg including an upper cuff 31 which may be a true rib or a mock rib construction integrally knit with a foot which includes an instep portion 32, a toe portion 36, a ball portion 33, a heel portion 34, and an arch portion 35, as best shown by the bracketed area in FIGS. 1–3, disposed between the ball and heel portions 33, 34. Accordingly, the arch portion 35 is preferably formed of one set of raised terry loops, but the arch portion may also be devoid of terry loops. The sock 30 is preferably knit throughout with a stretchable body yarn formed of nylon, spandex, or acrylic, but the sock 30 may also be formed of various other types of yarns throughout such as acrylic, cotton, or a combination of yarns.

Each of the ball and heel portions 33, 34 of the knit sock 30 is formed of thicker knit fabric than the arch portion 35. The thicker knit fabric is preferably a predetermined density of raised terry loops, preferably two or more sets of raised terry loops, thereby providing a greater amount of protection and cushioning to the ball and heel of the foot of the wearer. The arch portion 35 may be formed of raised terry loops, but such as to be thinner and have less cushioning than the ball or heel portions 33, 34. The arch portion 35 of the sock 30 may also have a substantially shorter lengthwise extent than either the ball or heel portions 33, 34 of the sock 30 such as in its relaxed position as illustrated in FIGS. 1 and 2 or may have a lengthwise extent shorter than the ball portion 33 and approximately equal to the lengthwise extent of the ball portion 34 such as in its stretched position on the foot of a wearer as illustrated in FIG. 3.

Also, as illustrated in FIGS. 1 and 2, the instep portion 32 of the sock 30 preferably has opposite side edges or peripheries forming lengthwise extending, opposing side panels 37, 38 which are knit without raised terry loops. The other opposing side panel 38 is not shown but is preferably a mirror image of the opposing side panel 37 shown in FIGS. 1 and 2. The side panels 37, 38 preferably extend lengthwise from the toe portion 36 to the upper cuff 31 and extend widthwise from a lower sole, formed by the ball, heel, and arch portions 33, 34, 35, several wales (i.e., preferably 4 to 14 wales) into the instep portion 32.

The shoe 50, as best shown in FIG. 4–6, 8, and 10–11, has a shoe upper 51 and a sole shown as an innersole 60 and an outersole 80. The shoe 50 illustrated is a casual walking shoe, but other various shoes, including athletic shoes, dress shoes, and sandal-type shoes, may also be used as will be apparent to those skilled in the art. The innersole 60 of the shoe 50 overlies the outersole 80 and has a ball portion 62, a heel portion 61, and a raised arch portion 63, as best shown by the bracketed portion in FIGS. 6 and 8, for contacting and interfacing with the respective overlying portions of the knit sock 30. The ball portion 62 extends lengthwise fore of the raised arch portion 63 and preferably includes the portion underlying the toe portion of an overlying sock or toes of the foot of the wearer thereof. The heel portion 61 extends lengthwise aft of the raised arch portion 63 as illustrated and preferably extends to include the heel portion of an overlying sock or the heel of the foot of a wearer thereof. The raised arch portion 63 of the innersole 60 may have a substantially shorter lengthwise extent than either the ball portion 62 or the heel portion 61, as illustrated and further disclosed in an embodiment of the invention in copending U.S. patent application Ser. No. 08/097,086 filed on Jul. 23, 1993 which is also hereby incorporated herein by reference or, as illustrated in the embodiment of the present patent application, may have a lengthwise extent that is substantially shorter than the ball portion 61 and approximately equal to or slightly greater than the lengthwise extent of the heel portion 61, as best shown in FIGS. 7–9, so that the lengthwise extent of the raised arch portion 63 of the innersole 60 corresponds substantially to the lengthwise extent of the thinner fabric arch portion 35 of the knit sock 30 when worn on the foot of a wearer so as to provide a substantially mating interfacing relationship for added protection and comfort to the wearer. The raised arch portion 63 also generally extends across the entire width of the innersole 60.

The matingly interface relationship of the sock 30 with the sole of the shoe 50, as best shown in FIGS. 7 and 9, thereby provides internal multi-directional movement in the thicker fabric portions of the sock 30 interfacing with the foot of the wearer so as to reduce impact and friction shearing forces received by the foot of the wearer. The matingly interface relationship is preferably a male/female cooperation type of approach that protects the foot during activity thereof such as walking, jogging, and participating in various sports. The footwear system according to the invention also provides a shoe 50 that comfortably receives a sock, such as the knit sock 30, having thicker fabric in the ball and heel portions thereof than in the arch without requiring a larger shoe size for the wearer of the sock.

The innersole 60 of the shoe 50, as best shown in FIGS. 6 and 12–17, is preferably formed of multiple layers including a backing layer 57 and an integrally molded foam layer 70 overlying the backing layer 57. The backing layer 57 (as shown in a first embodiment in FIGS. 12 and 16) preferably has a substantially uniform thickness throughout and may be integrally formed of a relatively stiff and flexible material, such as compressed paperboard, so as to impart relatively stiff support to the integrally molded foam layer 70. The backing layer 57'(as shown in a second embodiment in FIGS. 13 and 17) may also be bifurcated into first and second portions 57a', 57b' and secured along common and overlapping edges 57c', 57d'. The first portion 57a' of the backing layer 57' extends substantially the length of the ball portion 62', and the second portion 57b' extends substantially the length of the arch portion 63' and substantially the length of the heel portion 61'. The second portion 57b' is formed of a stiffer material than the first portion 57a' so that the stiffer second portion 57b' reduces lateral and bending movement of the heel and the arch of the wearer of the shoe 50, and yet the first portion 57a' still provides flexible bending in and around the ball and toes of the foot of the wearer. The material forming the first portion 57a' is preferably formed of compressed paperboard and the material forming the second portion 57b' is preferably formed of a more densely compressed paperboard.

Figure 16:
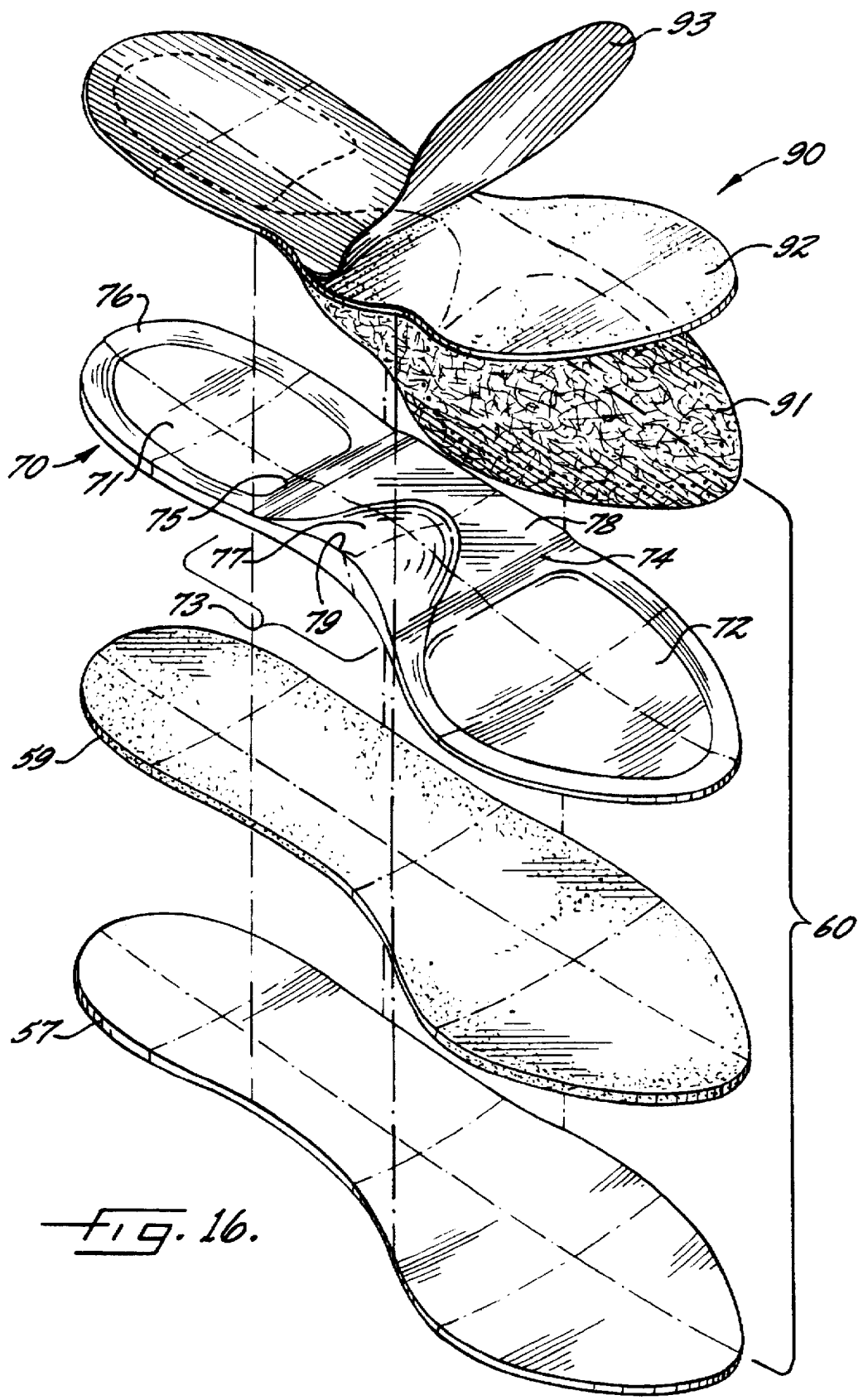
FIG. 16 is an exploded perspective view of an innersole of a shoe according to a first embodiment of a footwear system of the present invention.
Figure 17:
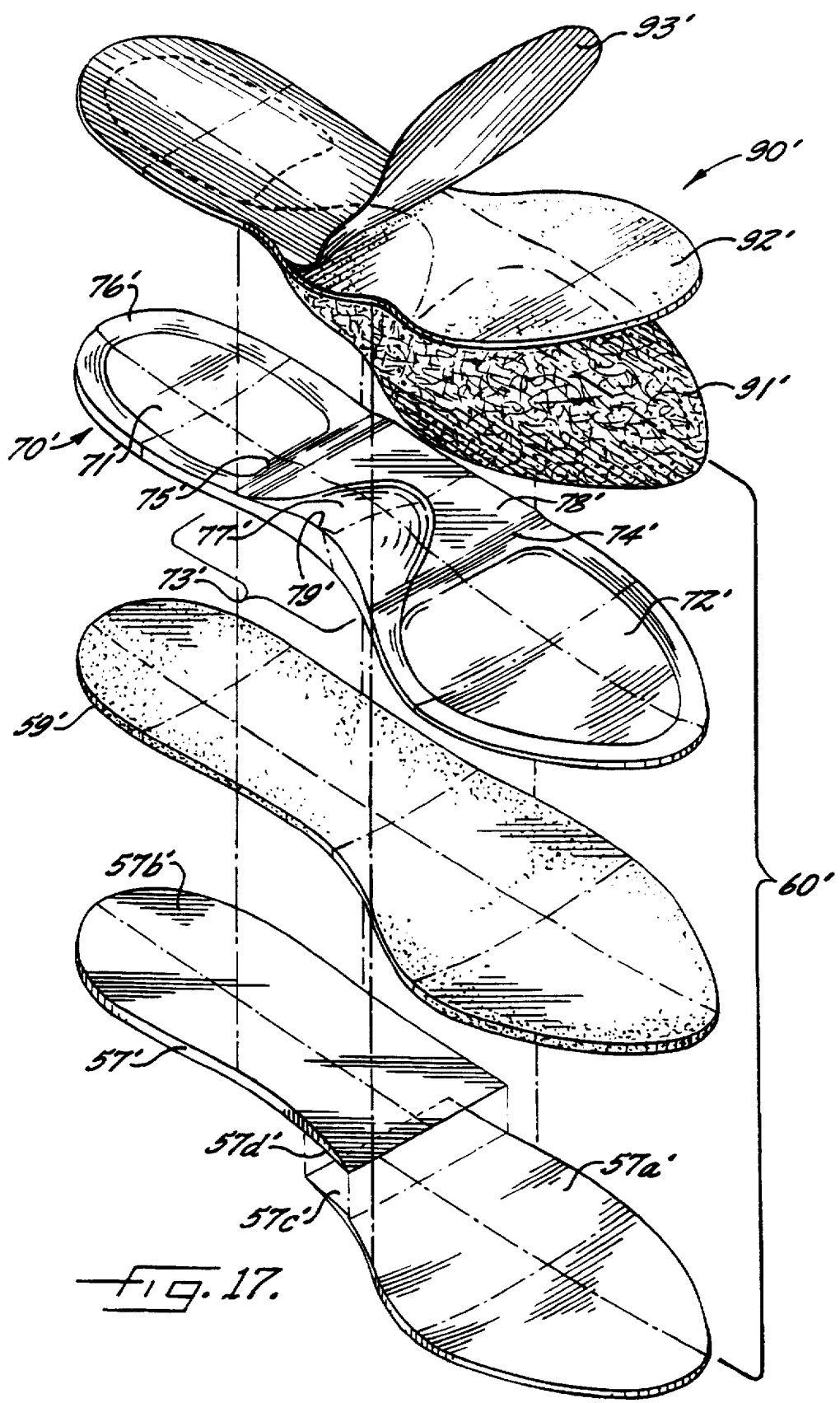
FIG. 17 is an exploded perspective view of an innersole of a shoe according to a second embodiment of a footwear system of the present invention.

Also in the second embodiment of the innersole 60, the first portion 57a is relatively thinner than the second portion 57b', and the two portions 57a', 57b' have adjoining inclined edges 57c', 57d' which are secured together in the arch portion 63' of the innersole 60' or in an area forming a transition between the ball portion 62' and the arch portion 63'. The backing layer 57 is illustrated in FIGS. 16 and 17 as a single layer, but may also comprise composite or multiple layers. As shown, the molded foam layer 70 and the backing layer 57 have substantially the same overall configuration.

An intermediate lower layer 59, preferably formed of a material such as PORON (a polyurethane material) manufactured by Rogers Corporation of Connecticut, having substantially the same overall configuration as the backing layer 57 and the molded foam layer 70 is preferably positioned between the backing layer 57 and the molded foam layer 70 as illustrated. The intermediate lower layer 59 provides additional backing as described above in reference to the backing layer 57 and provides additional overall thickness to the molded foam layer 70 of the innersole 60. The intermediate lower layer 59 may be cut and laminated to the compressed paperboard, and the overlying molded foam layer 70 then secured thereon. It will be apparent to those skilled in the art that the molded foam layer 70 may be molded so as to provide a thicker lower portion and a similarly dimensioned upper portion and still generally have the ball portion 72, heel portion 71, and raised arch portion 73 as described above and thereby eliminate the intermediate lower layer 59.

Also, in the illustrated embodiments, the innersole 60 preferably further has a lining layer 90, as best shown in the exploded views of FIGS. 16 and 17, that overlies and contacts the molded foam layer 70. The innersole lining layer 90 is preferably formed of a composite of three fabric layers 91, 92, 93. The lower fabric layer 91 is preferably formed of a fibrous material, the middle layer 92 is preferably formed of a foam material, and the upper layer 93 is preferably formed of Coolmax® or other lace-type fabric. These three composite layers 91, 92, 93 are desirably bonded and sewn together (as illustrated by the stitching 94) and have substantially the same overall configuration as the molded foam layer 70. The lining layer 90 is also preferably secured to the molded foam layer 70. The composite innersole lining layer 90 is formed of materials to help pull moisture away from the sock 30. This composite material may also line the inner walls of the shoe upper 51. The innersole lining layer 90 may also be constructed to have a varying coefficient of friction therealong so as to reduce the stress and shearing forces received by the foot during walking, running, or other uses. An example of such a lining layer may be seen in U.S. Pat. No. 4,893,418 by Ogden entitled "Shoe Insole And Method Of Manufacture" which is hereby incorporated herein by reference.

As best shown in FIGS. 8–11 and 14–17, the molded foam layer 70 preferably is formed of polyvinyldenachloride ("PVDC") closed cell foam material, but it will be apparent that other foam materials such as a polyurethane or polyethylene closed cell foam may also be used. The molded foam layer 70 has a thicker medial portion defining the raised arch portion 73 of the innersole 60 which matingly interfaces with the arch portion 35 of the knit sock 30. The raised arch portion 73 of the molded foam layer preferably includes a hump 77 extending widthwise from the medial side of the innersole 60 to central portions of the raised arch portion 73. The hump 77 preferably has a greater thickness along a medial periphery adjacent the medial side of the innersole, decreasing thickness toward a lateral periphery of the central portions of the innersole from the medial side thereof of the raised arch portion 73 as illustrated, and substantially the same contour as major portions of the arch of the foot of the wearer. The raised arch portion 73 also preferably includes a relatively flat plateau 78 extending outwardly from around the lateral periphery of the hump 77. The plateau 78 is raised with respect to the ball portion 72 and major areas of the heel portion 71 of the molded foam layer 70 of the innersole 60 so that corresponding areas of the arch portion 35 of the knit sock on the foot of a wearer matingly interface therewith.

The ball portion 61 and major areas of the heel portion 7 of the molded foam layer 70 of the innersole 60 are relatively thin and of substantially the same thickness. The plateau 78 of the raised arch portion 73 of the molded foam layer 70 is preferably about 1/8th of an inch thicker than either the ball portion 72 or the major areas of the heel portion 71. Preferably, the ball portion 72 and the major areas of the heel portion 7 of the molded foam layer 70 each have a thickness of about 1/16th of an inch, and the plateau 78 of the arch portion 73 of the molded foam layer 70 has a thickness of at least twice that of either the ball portion 72 or the heel portion 71, such as 3/16ths of an inch.

Additionally, the molded foam layer 70 of the innersole 60 further preferably has a thickened outer peripheral edge surrounding the major areas of the heel portion 71 and defining a raised heel ridge 76 so as to provide additional support for side heel areas of the wearer thereby providing added comfort to the wearer. The raised heel ridge 76 of the molded foam layer 70 preferably terminates at a lower height than the raised arch portion 73 of the molded foam layer 70.

The raised arch portion 73 of the molded foam layer 70 further preferably has a peripheral medical edge defining an upstanding arch ridge 79, as best illustrated in FIG. 14, which uninterruptedly joins the raised heel ridge 76. The upstanding arch ridge 79 extends higher than the raised heel ridge 76 for enhancing support of the instep arch portion of the wearer. The raised arch portion 73 of the molded foam layer 70, as best shown in FIGS. 12–15, preferably extends across the entire width of the innersole 60 from the arch ridge 79 toward the outstep of the innersole 60. It will also be apparent that the raised arch portion 73 of the molded foam layer 70 has a general decreasing thickness in cross-section so as to more closely conform to the incline of the arch portion of the foot having the thinner fabric arch portion 35 of the knit sock 30 positioned thereon.

The raised arch portion 73 of the molded foam layer 70 also has oppositely inclined fore and aft portions 74, 75, of decreasing thickness for providing a smooth transition with the thinner ball portion 72 and the major areas of the heel portion 71. The fore and aft portions 74, 75 of the raised arch portion 73 are preferably substantially parallel in a transverse direction for a more effective mating interfacing relationship with the thinner fabric arch portion 35 and the respective thicker fabric ball and heel portions 33, 34 of the knit sock 30. It will be understood by those skilled in the art that angled variations of the fore and aft portions 74, 75 in a transverse direction may also be used.

Also, the innersole 60 of the present invention may be secured to the outersole 80, or an intermediate layer sole therebetween, or may be used as an insert such as for an orthotic insert for other shoes not having the innersole to provide the mating interfacing relationship with the sock 30. If the innersole 60 is used as an insert, it would preferably have the backing layer configuration as shown in FIGS. 12 and 16.

In an embodiment of the footwear system wherein the innersole 60 is used as an insert, the shoe 50 preferably would be an extra-depth shoe adaptable for receiving the innersole 60 as well as other types of orthotic inserts when the innersole 60 is removed therefrom. The extra-depth shoe has a sole and a shoe upper 51. The sole as illustrated preferably includes a multilayer innersole 60 and an outersole 80. The extra-depth shoe preferably has an added depth of about one-quarter inch more than conventional shoes, and the combined thickness of the multilayer innersole 60 has a thickness of about one-quarter inch in the ball portion 72 and major areas of the heel portion 71. For example, the conventional shoe may have a depth adapted to receive the foot of a wearer of about two and one-eight inches from the upper surface of major areas of the heel portion to slightly below the ankle in the shoe upper, i.e., low-top shoe. An extra-depth shoe, on the other hand, has a depth in this position of two and three-eighths inches from the upper surface of major areas of the heel portion to slightly below the ankle in the shoe upper. It will be understood by those skilled in the art that the dimensions of this depth of the shoe, according to the present invention, may vary depending on the style of shoe and the thickness of the insert desired. The extra-depth shoe embodiment of the footwear system preferably also substantially conforms to the illustrated drawings, but having the innersole 60 as illustrated being adaptable for ease of insertion and removal from the shoe.

As set forth above, the innersole 60 as an insert would preferably have the backing layer configuration as shown in FIGS. 12 and 16. The shoe 50 would then preferably have a bifurcated intermediate backing layer 57', as best shown in FIG. 17, overlying the outersole 80 on the inside of the shoe 50. The first portion 57a' of the intermediate backing layer 57' extends substantially the length of the ball portion 62', and the second portion 57b' extends substantially the length of the arch portion 63' and substantially the length of the heel portion 61'. The second portion 57b' is formed of a stiffer material than the first portion 57a' so that the stiffer second portion 57b' reduces lateral and bending movement of the heel and the arch of the wearer of the shoe 50, and yet the first portion 57a' still provides flexible bending in and around the ball and toes of the foot of the wearer. The material forming the first portion 57a' is preferably formed of compressed paperboard and the material forming the second portion 57b' is preferably formed of a more densely compressed paperboard. A lining layer 90 substantially the same as the lining layer 90 as described with the innersole 60 overlies the intermediate backing layer 57' to provide ease of removal and insertion of the innersole 60 insert as shown in FIGS. 12 and 16. It will be understood by those skilled in the art that other types of extra-depth shoes or other shoes as needed can also be adaptable to receive the innersole 60 insert according to the present invention.

Figure 5:
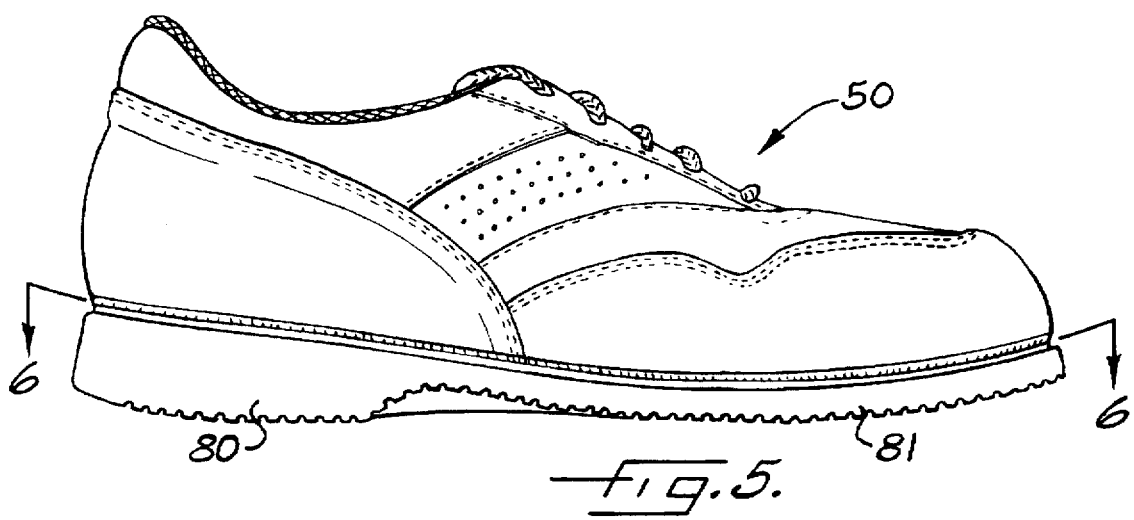
FIG. 5 is a side elevational view of a shoe of a footwear system according to the present invention.
Figure 6:
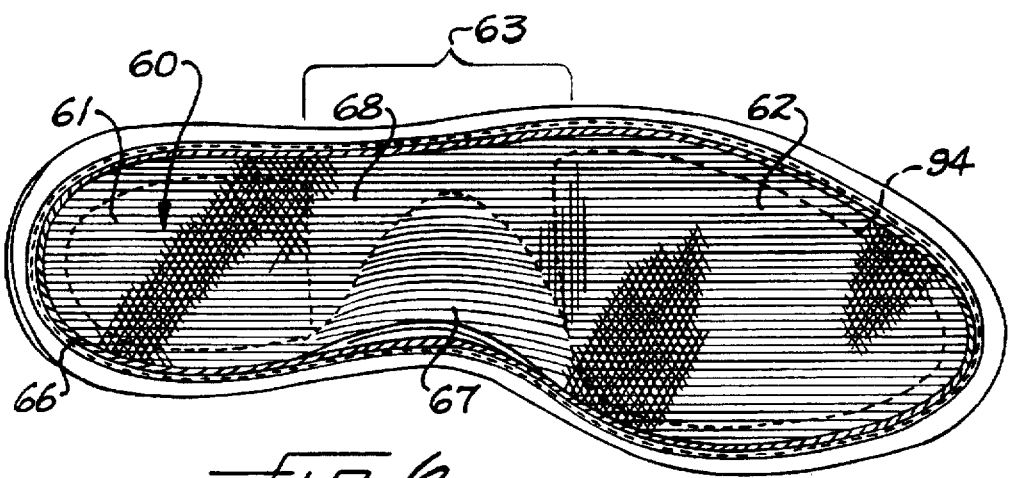
FIG. 6 is a horizontal sectional view of a shoe of a footwear system according to the present invention taken along line 6—6 of FIG. 5 and illustrating the innersole of the shoe.
Figure 10:
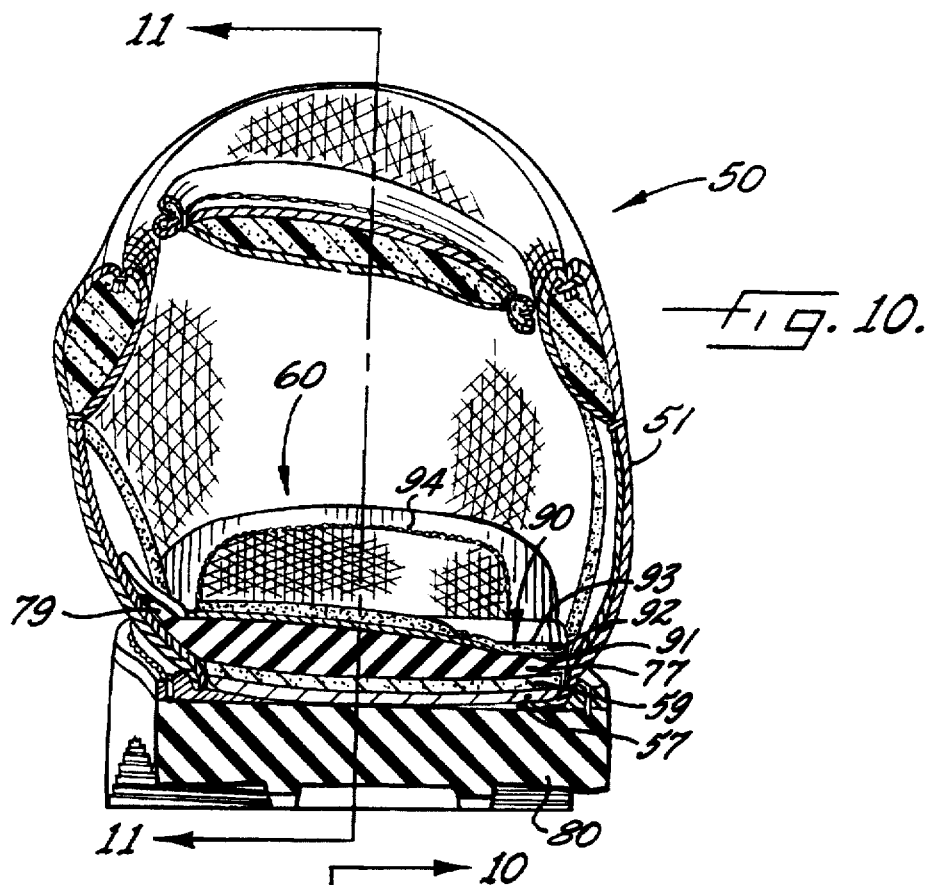
FIG. 10 is a vertical cross-sectional view of a shoe of a footwear system according to the present invention taken along line 10—10 of FIG. 7.
Figure 11:
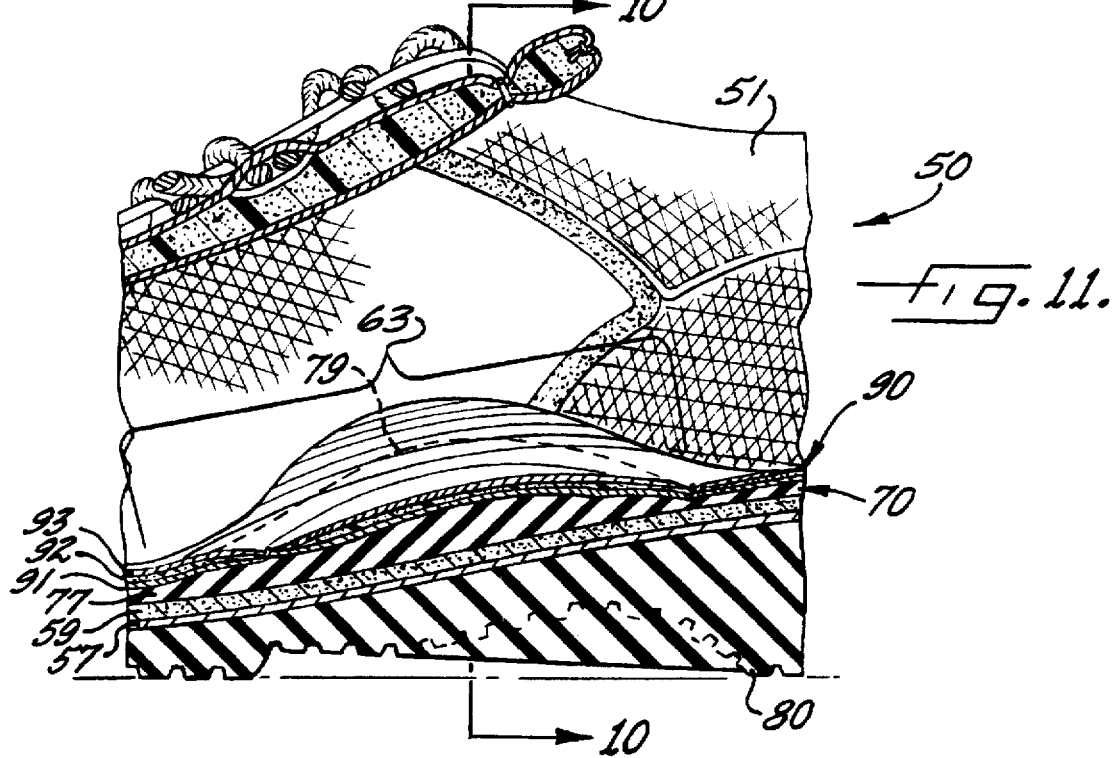
FIG. 11 is a fragmentary cross-sectional view of a shoe of a footwear system according to the present invention illustrating the raised arch portion of the innersole of the shoe.

The outersole 80 of the shoe 50 according to the embodiments of the present invention, as best shown in FIGS. 5 and 8, is formed of an integrally molded foam material such as a Vibram® outersole manufactured by Quabaug Corporation of North Brookfield, Massachusetts. The outersole 80 preferably has a roughened outer surface shown in the form of a plurality of ribs 81 for providing increased frictional contact with the ground or surface upon which the wearer walks. The plurality of ribs 81 preferably extend across the entire widthwise extent of the outersole 80 and generally are parallel to each other in a transverse direction. It also will be apparent to those skilled in the art that the outersole 80, although illustrated as a single molded foam layer, may comprise various other types or styles, including two composite layers, more than two composite layers, or a fabricated unit outersole which is fabricated and not molded.

In the drawings and specification, there has been disclosed typical preferred embodiments of the invention and, although specific terms are employed, they are used in a generic and descriptive sense only and not for the purposes of limitation. The invention has been described in considerable detail with specific reference to various preferred embodiments. It will be apparent, however, that various modifications and changes can be made within the spirit and scope of the invention as described in the foregoing specification and defined in the appended claims.

That which is claimed is:

1. An innersole for inserting into a shoe to enhance the comfort thereof, said innersole comprising:

a backing layer and a molded foam layer overlying said backing layer and secured thereto, said backing layer and molded foam layer having substantially the same overall configuration, said innersole including a ball portion, a heel portion, and a raised arch portion extending therebetween, said raised arch portion extending across substantially the entire width of the innersole in the form of a substantially flat plateau, said plateau including oppositely inclined fore and aft portions for providing a smooth transition with said ball portion and a major area of said heel portion, said arch portion further including a hump extending upwardly from said substantially flat plateau, said hump having a greater thickness along a medial portion of said arch portion and a decreasing thickness toward a central portion thereof; and said heel portion having a thickened outer peripheral edge defining a raised heel ridge, so as to provide additional support for side heel areas of the wearer.

2. An innersole according to claim 1, wherein said backing layer has a first portion and a second portion, said first portion extending substantially the length of said ball portion and into said raised arch portion and being secured to said second portion, said second portion extending lengthwise from said raised arch portion and substantially the length of said heel portion, said first and second portions being formed of a relatively stiff material, said second portion being stiffer than said first portion so that said stiffer second portion reduces lateral movement of the heel of the wearer thereof.

3. An innersole according to claim 1, wherein said fore and aft portions of said raised arch portion of said molded foam layer are substantially parallel in a transverse direction for an effective matingly interfacing relationship with an arch portion of a sock having thickened ball and heel portions.

4. An innersole according to claim 1, wherein said ball portion and said heel portion of said molded foam layer each have a thickness of about 1/16th of an inch, and said plateau of said raised arch portion of said molded foam layer has a thickness of at least twice that of either said ball or said heel portion.

5. A shoe for providing enhanced comfort to the foot of a wearer and adapted for matingly interfacing with a worn sock of the type that has thicker knit fabric in heel and ball portions than an arch portion thereof, said shoe comprising:

an outersole; and a multiple layer innersole having a backing layer and a molded foam layer overlying said backing layer and secured thereto, said backing layer and said molded foam layer having substantially the same overall configuration, said multiple layer innersole including a ball portion, a heel portion, and a raised arch portion extending substantially the entire width of said multiple layer innersole for interfacing with respective overlying portions of a knit sock, said ball portion and major areas of said heel portion of said molded foam layer being relatively thin and of substantially the same thickness, said heel portion of said molded foam layer having a thickened outer peripheral edge defining a raised heel ridge so as to provide additional support for side heel areas of the wearer, and said raised arch portion including a substantially flat plateau portion having oppositely inclined fore and aft portions for providing a smooth transition with said ball portion and major areas of said heel portions, and said raised arch portion having a hump extending above said substantially flat plateau portion, said hump having a greater thickness along a medial portion of said raised arch portion and a decreasing thickness toward a central portion thereof for comfortably supporting the arch of the foot of the wearer.

6. A shoe according to claim 5, wherein said multiple layer innersole further comprises a lining layer overlying said molded foam layer and being secured thereto, said lining layer having substantially the same overall configuration as said molded foam layer and said backing layer.

7. A shoe according to claim 5, wherein said backing layer is integrally formed of a material being flexible enough to bend and being rigid enough to impart support to the molded foam layer.

8. A shoe according to claim 5, wherein said backing layer of said multiple layer innersole has a first portion and a second portion, said first portion extending substantially the length of said ball portion and into said raised arch portion and being secured to said second portion, said second portion extending lengthwise from said raised arch portion and substantially the length of said heel portion, said first and second portions being formed of a flexible material, said second portion being less flexible than said first portion so that said less flexible second portion reduces lateral movement of the heel of the wearer of the shoe.

9. A shoe according to claim 5, wherein said plateau of said raised arch portion of said molded foam layer is about 1/8th of an inch thicker than either said ball portion or said major areas of said heel portion of said molded foam layer.

10. A shoe according to claim 5, wherein said raised heel ridge of said molded foam layer terminates at a lower height than said raised arch portion of said molded foam layer and wherein said hump of said raised arch portion extends widthwise from the medial side of said innersole to central portions of said raised arch portion and has a greater thickness along the medial side, decreasing thickness toward said central portions of said raised arch portion, and substantially the same contour as major portions of the arch of the foot of a wearer.

11. A shoe according to claim 10, wherein said raised arch portion of said molded foam layer has a peripheral medial side edge defining an upstanding arch ridge which uninterruptedly joins said raised heel ridge and wherein said upstanding arch ridge extends higher than said raised heel ridge for enhancing support of the medial side arch portion of the foot of the wearer.

12. A shoe according to claim 5, wherein said fore and aft portions of said raised arch portion of said molded foam layer are substantially parallel in a transverse direction for a more effective matingly interfacing relationship with overlaying arch portion of said sock.

13. A shoe according to claim 5, wherein said ball portion and said heel portion of said molded foam layer each has a thickness of about 1/16th of an inch, and said plateau of said raised arch portion of said molded foam layer has a thickness of at least twice that of either said ball or heel portion.

* * * * *